Fig. 2

Robert B. Blizard
INVENTOR.

Robert B. Blizard
INVENTOR.

BY Donald H. Fidler
ATTORNEY

Dec. 20, 1966

R. B. BLIZARD 3,292,729

VELOCITY LOGGING APPARATUS

Filed Dec. 23, 1959

Robert B. Blizard
INVENTOR.

BY Donald H. Fidler
ATTORNEY

United States Patent Office 3,292,729
Patented Dec. 20, 1966

3,292,729
VELOCITY LOGGING APPARATUS
Robert B. Blizard, Littleton, Colo., assignor to Schlumberger Well Surveying Corporation, Houston, Tex., a corporation of Texas
Filed Dec. 23, 1959, Ser. No. 861,502
13 Claims. (Cl. 181—.5)

The present invention relates to acoustic velocity logging methods and apparatus, and, more particularly, to acoustic velocity logging apparatus to selectively obtain either single or multiple travel time indications over one or more selected intervals along a bore.

In prior acoustic velocity logging systems, indications of travel time have been limited to a single travel time ($\Delta t$) of acoustic energy through earth formations intermediate a pair of acoustic receivers. It has been proposed to provide additional receivers and a mechanical switch to change the span between the receivers so that it is possible to obtain a $\Delta t$ indication over, say, either a one-foot span or a three-foot span. However, the choice between one of two predetermined spans is not always adequate for every condition encountered so that it is desirable to provide flexibility and versatility in the number and the length of spans to chose from. Further, it is also desirable to obtain simultaneous indications from more than one span so that interpretation of the formations may be facilitated.

It is accordingly an object of the present invention to provide new and improved systems of acoustic velocity logging for obtaining multiple travel time indications corresponding to multiple spans between a number of acoustic receivers concurrently with the passage of the apparatus through a borehole.

Another object of the present invention is to provide new and improved acoustic velocity logging systems for selectively obtaining one or more travel time indications over one or more different spans concurrently with the passage of portions of the system through a bore.

In systems according to the present invention, a borehole exploring instrument is provided with an acoustic transmitter and spaced therefrom, a plurality of acoustic receivers or receptors having spans between adjacent receivers over which the travel time ($\Delta t$) of acoustic energy is measured. Periodic pulses of acoustic energy are emitted by the transmitter and the time of arrival of the acoustic energy is detected at the respective receivers to develop indications of the travel times of acoustic energy between the receivers. Each of the receiver circuits is operatively conditioned to detect the acoustic energy in a sequence beginning with a first receiver adjacent to the transmitter.

More particularly, the detected signal at the first receiver operatively conditions the second receiver, the detected signal at the second receiver operatively conditions the third receiver, and so forth.

The detected signals derived from the receivers effectively constitute a train or series of signals or time markers, the time interval between any two selected time markers being the travel time ($\Delta t$) of acoustic energy between the corresponding receivers.

At the surface, a desired time interval or $\Delta t$ indication for the travel of acoustic energy between certain receivers may be selectively obtained so that the $\Delta t$ indications are developed in response only to the signals correspondingly developed by the certain receivers.

The novel features of the present invention are set forth with particularity in the appended claims. The present invention both as to its organization and manner of operation, together with further objects and advantages thereof, may best be understood by way of illustration and example of certain embodiments when taken in conjunction with the accompanying drawings in which:

Figure 1:
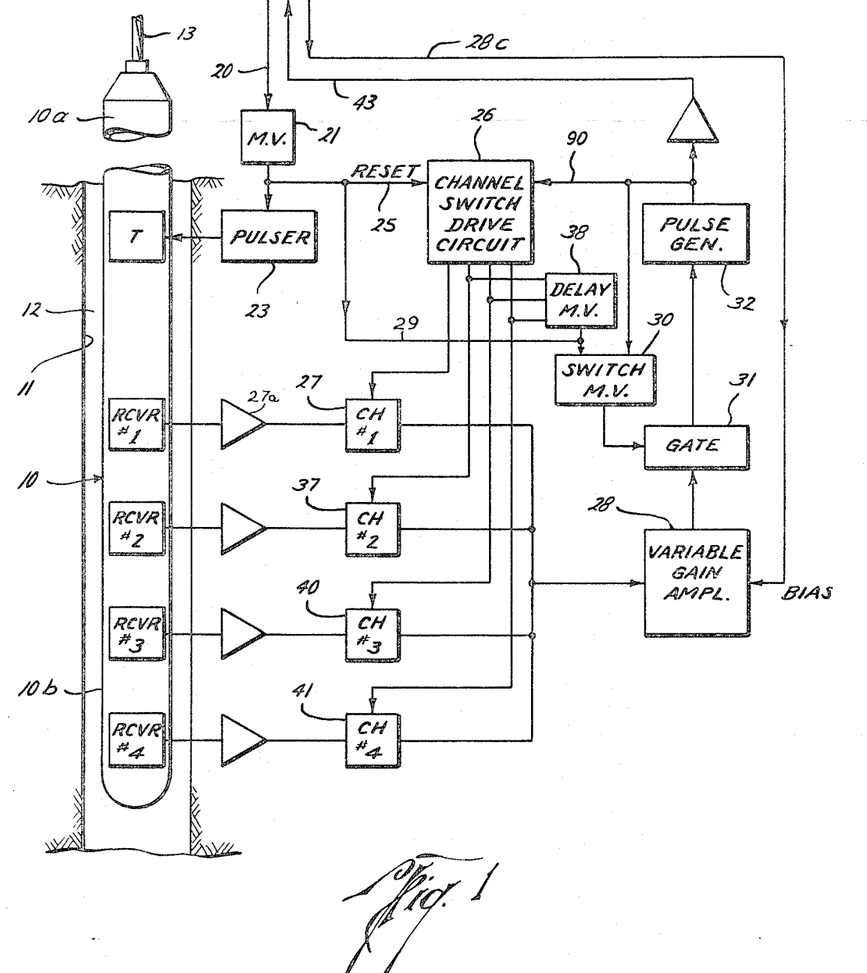
FIG. 1 is a schematic diagram showing acoustic well logging apparatus disposed in a bore drilled in the earth (shown in cross-section) with a block diagram of electronic equipment contained in the cartridge portion shown to the right of the borehole apparatus.

Referring now to FIG. 1, an acoustic well logging apparatus 10 is shown which is adapted to be lowered into a bore 11 containing fluid 12 by means of a winch (not shown) and cable 13 in a conventional manner. The apparatus or support 10 includes an upper fluid-tight electronic cartridge 10a (only partially shown) for certain downhole electronic equipment to be described hereinafter and a lower assembly 10b that carries an acoustic energy transmitter T and a plurality of longitudinally spaced-apart acoustic receivers or receptors $R_1$, $R_2$, $R_3$ and $R_4$. Electrical conductors running through the supporting cable 13 and insulated therefrom connect the downhole electronic equipment (shown in detail to right of the borehole apparatus 10) to surface electronic equipment (shown in detail in FIG. 2) which may be mounted in a panel at the earth's surface, for example.

Figure 2:
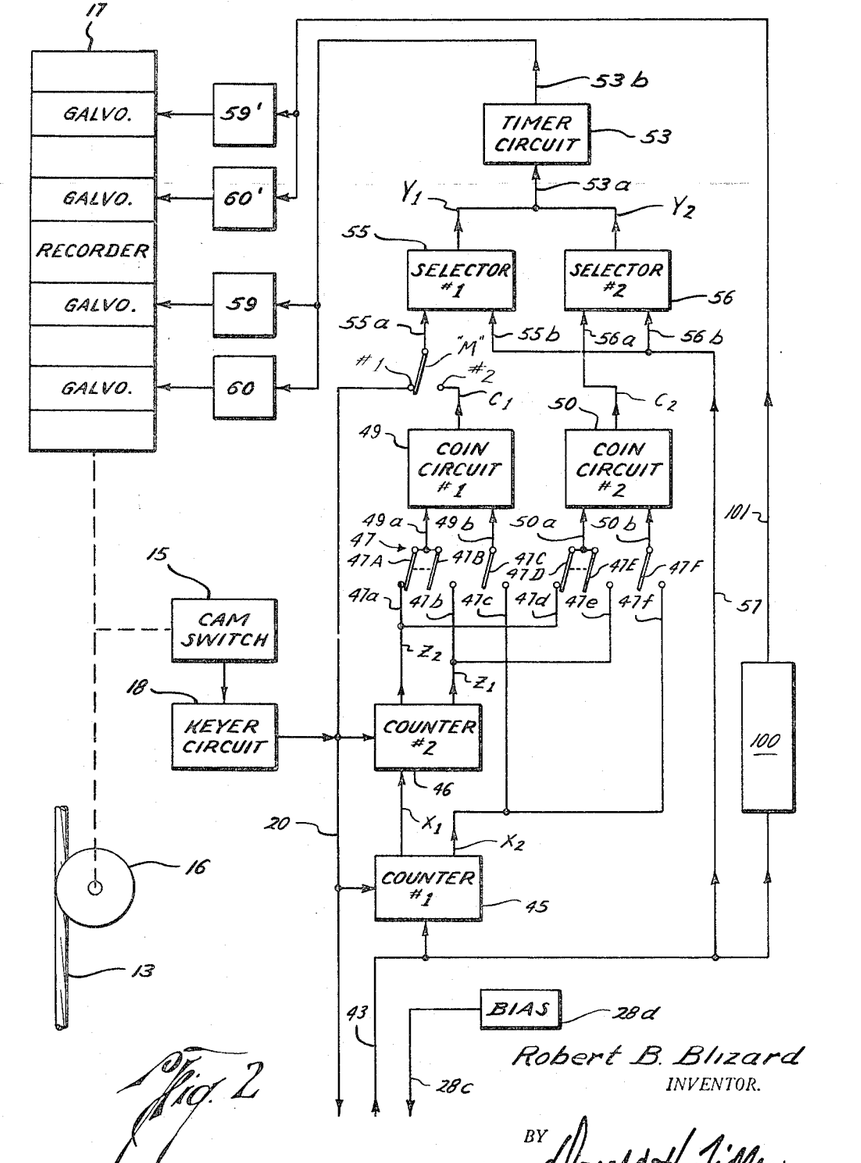
FIG. 2 is a block diagram illustrating schematically the surface portion of the acoustic well logging apparatus.

Refering first to the panel equipment shown in FIG. 2, a fixed number of master pulses per foot of travel of the apparatus in the bore is obtained by mechanically coupling a cam operated switch 15 to a cable wheel 16 that frictionally engages the cable 13 as it lowers or raises the logging apparatus 10. A recorder 17 is coupled to the cable wheel 16 in a conventional manner so that its record medium is advanced at a rate which is proportional to the rate of travel of the apparatus in the bore. Instead of a cam operated switch 15, a selsyn motor arrangement or other suitable means could be coupled to the recorder to periodically produce master pulses.

Figure 3:
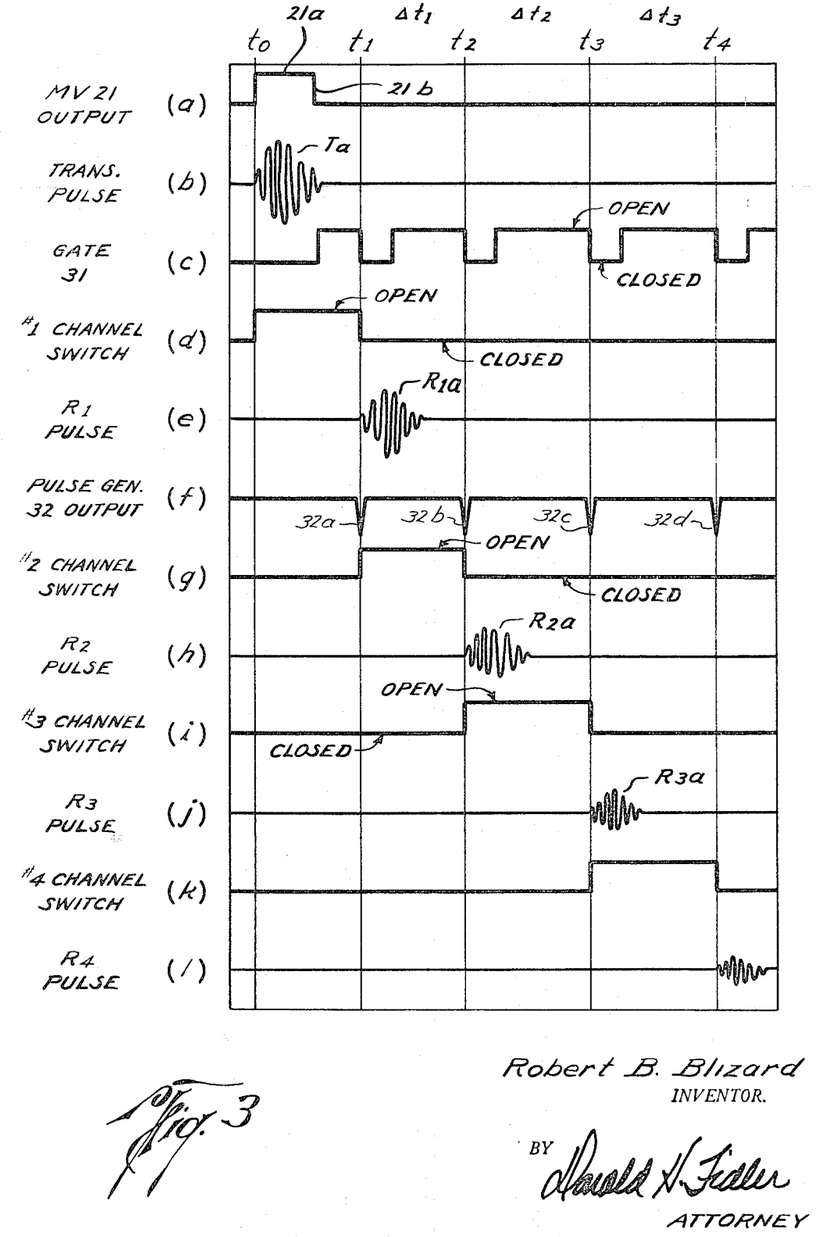
FIG. 3 is a graph illustrating the squence of events in the operation of the bore equipment.

Cam operated switch 15 is coupled directly to a master keyer circuit 18 which, for example, may be a bistable multivibrator and periodically triggers the keyer circuit a number of times per foot of cable travel so that the keyer circuit produces a number of electric pulses per foot of cable travel. The pulse output of the master keyer 18 is coupled by a conductor 20 to the input of a monostable multivibrator 21 mounted in the cartridge 10a of FIG. 1. The multivibrator 21 is responsive to keying pulses to produce a pulse output 21a (FIG. 3a) at a time $t_0$ which is sent without delay to a pulser circuit 23 (FIG. 1) which triggers the transmitter T to emit acoustic energy T$a$ (FIG. 3b) into the adjacent fluid and media surrounding the bore 11 in a well-known manner. The pulser circuit 23, for example, may include a cathode follower circuit and a hydrogen thyratron tube triggered to drive the acoustic transmitter T which may be a magtnetostrictive transducer.

The output pulse 21a of multivibrator 21 is also coupled by means of a conductor 25 to a channel switch drive circuit 26 which, in turn, actuates a #1 channel switch circuit 27 so that the #1 channel switch is operatively conditioned to pass an electrical signal from the first receiver $R_1$ to a variable gain amplifier 28. The output pulse 21a of multivibrator 21 is also coupled by means of a conductor 29 to a multivibrator switch 30 to actuate the switch 30 after a suitable time delay. For example, pulse 21a may have a time duration of 120 microseconds and switch 30 may be actuated by the down-coming portion 21b of the pulse 21a as shown in FIG. 3a. Switch 30, when actuated, operatively conditions an anti-noise gate 31 to pass signals from the variable gain amplifier 28 to a pulse generator 32. The time delay is provided so that the gate 31 remains closed until just prior to the earliest possible time of arrival of the acoustic wave at the first receiver $R_1$; hence, the likelihood of noise signals accidentally triggering the apparatus is decreased. As shown in FIGS. 3a–3d, #1 channel switch 27 is opened simultaneously with the transmitter pulse Ta to pass signals therethrough, while 120 microseconds later, gate 31 is opened to pass signals therethrough.

The transmitter T generates acoustic waves or pulses which are detected as they travel along the adjacent media by the series of receivers $R_1$, $R_2$, $R_3$ and $R_4$ which, for example, may be magnetostrictive devices. An acoustic wave T, for example, generated at a time $t_0$, may arrive at the first receiver $R_1$ at a time $t_1$, the receiver developing an electrical signal $R_{1a}$ (FIG. 3e) representative of the acoustic energy. The electrical signal $R_{1a}$ is amplified by a preamplifier 27a and, since the #1 channel switch 27 has been placed in condition to pass signals from the receiver $R_1$ by the keyer pulse 21a received from multivibrator 21, the electrical signal $R_{1a}$ is passed to the variable gain amplifier 28. By this time, more than 120 microseconds have elapsed and, therefore, the switch multivibrator 30 has been turned "on" to operatively condition the anti-noise gate 31 so that the electrical signal $R_{1a}$ is passed to and actuates a pulse generator 32 which, for example, may be a monostable multivibrator. Pulse generator 32, in response to the electrical signal, develops a sharp, negative-going pulse 32a which serves as a time marker for the arrival of acoustic energy at the receiver.

In the bore equipment, the output pulse 32a (FIG. 3f) of the pulse generator 32 is coupled to the switch multivibrator 30 to place it in an "off" condition which closes the anti-noise gate 31 (FIG. 3c). The output pulse 32a of the pulse generator 32 is also coupled to the channel switch drive circuit 26 which responds to the pulse generator output 32a to place #2 channel switch circuit 37 in condition to pass signals from the second receiver $R_2$ to the variable gain amplifier 28 (FIG. 3g) and to close the #1 channel switch 27 (FIG. 3d). When the switch drive circuit 26 actuates #2 channel switch 37, it also triggers a delay circuit 38, for example, a monostable multivibrator, which, after a delay of, say, 30 microseconds, produces an output placing the switch multivibrator 30 in the "on" position again, thereby opening the gate 31 (FIG. 3c) just prior to the earliest possible arrival of the signal generated when the acoustic wave reaches the second receiver $R_2$. The reason for closing the anti-noise gate 31 during the time between the two signals is to block the switching transient resulting from channel switching and also to reduce the likelihood of triggering on noise.

When the acoustic wave Ta arrives at the second receiver $R_2$ at the time $t_2$, an electrical signal $R_{2a}$ (FIG. 3h) is developed and passed through the #2 channel switch 37, the variable gain amplifier 28 and gate 31 to trigger the pulse generator 32. The output 32b (FIG. 3f) of the pulse generator 32 at the time $t_2$ is supplied to the switch drive circuit 26 and switch multivibrator 30 as before and places #3 channel switch circuit 40 in condition to pass signals from the third receiver $R_3$ to the variable gain amplifier 28 (FIG. 3i) and also closes #2 channel switch 37 (FIG. 3g).

When the acoustic wave arrives at receiver $R_3$ at the time $t_3$, the pulse generator 32 produces an output pulse 32c (FIG. 3f) and #4 channel switch circuit 41 is operatively conditioned to pass signals from the fourth receiver $R_4$ to the variable gain amplifier 28 (FIG. 3k) while #3 channel switch is closed (FIG. 3i). Likewise, the arrival of the acoustic wave at receiver $R_4$ at the time $t_4$ produces a similar operation so that pulse generator 32 produces an output pulse 32d (FIG. 3f) which closes #4 channel switch.

The output pulses 32a, 32b, 32c, 32d, from the pulse generator 32 at the time $t_1$–$t_4$ are amplified and supplied via conductor 43 in the cable to the surface panel as shown in FIG. 2. It will be particularly noted that the time interval or $\Delta t_1$ between pulses 32a and 32b at times $t_1$ and $t_2$ is obtained over the span between receiver $R_1$ and $R_2$, the time interval $\Delta t_2$ between pulses 32b and 32c at time $t_2$ and $t_3$ is obtained over the span between receiver $R_2$ and $R_3$ while the time interval $\Delta t_3$ between pulses 32c and 32d at times $t_3$ and $t_4$ is obtained over the span between receivers $R_3$ and $R_4$. Thus, the time intervals $\Delta t_1$–$\Delta t_3$ provide a means of measuring the acoustic velocity between each of the receivers. As will become more apparent from the discussion to follow, any one or a combination of the time intervals may be selectively indicated. For example, if the span between receivers $R_1$ and $R_2$ is 1 foot, the span between $R_2$ and $R_3$ is 2 feet and the span between $R_3$ and $R_4$ is 3 feet, combinations of $\Delta t$'s may be obtained for spans of 1, 2, 3, 5 and 6 feet.

Figure 4:
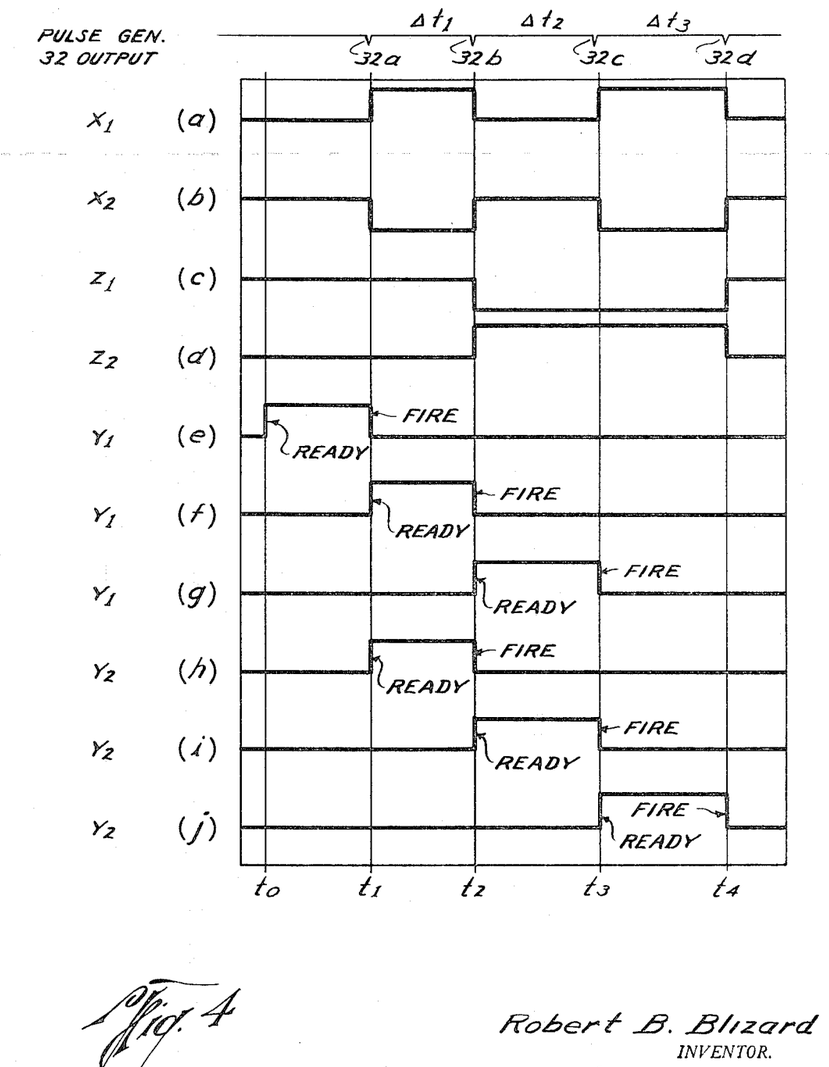
FIG. 4 is a diagram illustrating the sequence of events in the operation of the surface equipment.

The panel at the surface as shown in FIG. 2 includes a #1 counter circuit 45 and a #2 counter circuit 46 (such as bistable multivibrators) tandem coupled so that the #1 counter circuit 45 is responsive to each pulse delivered from conductor 43 while the #2 counter circuit 46 is responsive to the #1 counter circuit 45 for each two pulses applied to the #1 counter circuit 45. The counter circuits 45, 46 have outputs $X_1$, $X_2$ and outputs $Z_1$, $Z_2$ respectively and, characteristically, the respective outputs will have a certain magnitude and opposite polarities, i.e., at the time $t_0$ (FIGS. 4a and 4b) output $X_1$ will be relatively negative with respect to output $X_2$. Similarly, output $Z_1$ will be relatively positive with respect to output $Z_2$ while output $Z_2$ will be relatively negative with respect to output $Z_1$ (FIGS. 4c and 4d). Outputs $X_1$, $X_2$, $Z_1$, $Z_2$ for each pulse input may, therefore, be considered as coded.

It will be noted that, at the time $t_0$ when the transmitter is triggered, these initial conditions are caused by the application of the master pulse 21a via conductor 20 to the counter circuits 45, 46. The successive pulse inputs 32a–32d from the bore instrument at the respective times $t_1$–$t_4$ to the counter circuit 45 alternate the polarity outputs $X_1$, $X_2$ and $Z_1$, $Z_2$ in a selected manner as shown in FIGS. 4a–4d and summarized by the following table:

TABLE I

| Time | $X_1$ | $X_2$ | $Z_1$ | $Z_2$ | Coincident Negative Outputs |
|---|---|---|---|---|---|
| $t_0$–$t_1$ | − | + | + | − | $X_1, Z_2$ |
| $t_1$–$t_2$ | + | − | + | − | $X_2, Z_2$ |
| $t_2$–$t_3$ | − | + | − | + | $X_1, Z_1$ |
| $t_3$–$t_4$ | + | − | − | + | $X_2, Z_1$ |

As will become more apparent in the discussion to follow, the coincidence of relatively negative outputs will be significant to the selection of desired time intervals ($\Delta t$'s).

Selectively operable switches indicated generally by the numeral 47 couple the outputs $X_1$, $X_2$, $Z_1$ and $Z_2$ in various combinations to a #1 coincidence circuit 49 and a #2 coincidence circuit 50, each having a pair of inputs 49a, 49b and 50a, 50b, respectively. As could be surmised, coincidence circuits 49 and 50 respond to coincident negative pulses to their respective inputs 49a, 49b and 50a, 50b to produce an output pulse or, if only one input of a coincident circuit is employed, a negative pulse input will cause the circuit to develop an output pulse.

The switches 47 include contacts 47a–47f and movable contactors 47A–47F. Contacts 47a and 47d are connected to the $Z_2$ output; contacts 47b and 47e are connected to the $Z_1$ output; and contacts 47c and 47f are connected to the $X_2$ output. Movable contactors 47A and 47B are jointly movable to couple either output $Z_2$ or output $Z_1$ to coincidence input 49a. Contactor 47C is movable between an open position and a contacting position with contact 47c to couple the $X_2$ output to the input 49b of coincident circuit 49. Contactors 47D and 47E are jointly movable to couple either output $Z_1$ or output $Z_2$ to coincidence input 50a. Contactor 47F is movable between an open position and a contacting position with contact 47f to couple the output $X_2$ to the input 50b of the coincidence circuit 50.

A tabulation of various switch connections and the outputs $C_1$ and $C_2$ of coincidence circuits 49 and 50 is provided in Tables II and III, respectively, in order to facilitate an understanding of the present invention.

TABLE II

Coincident circuit output $C_1$ during:

| Contracts Closed | $t_0$–$t_1$ | $t_1$–$t_2$ | $t_2$–$t_3$ | $t_3$–$t_4$ |
|---|---|---|---|---|
| 47A, 47a | Yes | Yes | | |
| 47B, 47b | | | Yes | Yes |
| 47A, 47a, and 47C, 47c | | Yes | | |
| 47B, 47b and 47C, 47c | | | | Yes |
| 47C, 47c | | Yes | | Yes |

TABLE III

Coincident circuit output $C_2$ during:

| Contracts Closed | $t_0$–$t_1$ | $t_1$–$t_2$ | $t_2$–$t_3$ | $t_3$–$t_4$ |
|---|---|---|---|---|
| 47D, 47d | Yes | Yes | | |
| 47E, 47e | | | Yes | Yes |
| 47D, 47d and 47F, 47f | | Yes | | |
| 47E, 47e and 47F, 47f | | | | Yes |
| 47F, 47f | | Yes | | Yes |

The output signals $C_1$ and $C_2$ of the coincident circuits 49 and 50, respectively, are employed in deriving the signals representing the time interval required for acoustic energy to travel between a pair of selected receivers.

The Tables II and III provide a schedule of the outputs $C_1$ and $C_2$, with the particular switch system illustrated. In FIG. 2, a system for obtaining a $\Delta t$ or time interval indication for a pair of selected receivers is illustrated wherein a time interval is measured between a pair of selected pulses of a train or series of pulses. To simplify the explanation of this system consider the time interval $\Delta t$ to be the time between the first pulse of the pair of selected pulses, which occurs at a time $t_j$, and the second pulse of the pair, which occurs at a time $t_k$. Typically, at least one other pulse precedes the pulse at time $t_j$, and the pulse at time $t_k$ is preceded by the pulse occurring at time $t_j$ or another pulse occurring intermediate of the pulses at times $t_j$ and $t_k$. In order to obtain this $\Delta t$ time interval, pulse selective means are provided which are conditioned by "readying" pulses preceding the pulses at time $t_j$ and $t_k$ and operated or "fired" by the pulses occurring at times $t_j$ and $t_k$. Such a pulse selective means includes, for example, a timer circuit 53 such as a bistable multivibrator or "flip-flop" provided with an input 53a and an output 53b. The output circuit 53b should then deliver a pulse having a time duration equal to the time interval between pulses occurring at a time $t_j$ and a time $t_k$ and the input circuit 53a should be supplied with pulses at the times $t_j$ and $t_k$.

To supply the pulses at a time $t_j$ to the timer circuit 53, first selector circuit 55 such as a "flip-flop" multivibrator is provided having input circuits 55a, 55b where the one input 55a is to receive an input signal at a time $t_j$–1 to "ready" the selector circuit while the other input 55b receives the succeeding pulse at time $t_j$ to "fire" the selector circuit 55 thereby to develop an output pulse at time $t_j$ which triggers the timer circuit 53.

To supply the pulse at a time $t_k$ to the timer circuit 53, a second selector circuit 56 is provided having input circuits 56a, 56b where the one input 56a receives an input signal at a time $t_k$–1 to "ready" the selector circuit 56 while the other input 55b receives the succeeding pulse at a time $t_k$ which triggers the selector circuit thereby to develop an output pulse at a time $t_k$ which triggers the timer circuit 53.

The "ready" input 55a to the first selector circuit is adapted to be coupled to the first coincidence circuit 49 by a switch M when the switch M is in its No. 2 position so that the output of the coincidence circuit 49 serves to "ready" the selector circuit at a time ($t_j$–1). The "fire" input 55b of the first selector circuit is coupled to the conductor 43 via a lead 57 so that a pulse at time $t_j$ "fires" the selector circuit 55 thereby to develop an output pulse at time $t_j$.

In the second selector circuit the "ready" input 56a is coupled to the second coincidence circuit 50 so that the coincidence circuit 50 serves to "ready" the flip-flop at a time $t_k$–1. The "fire" input 56b of the second selector circuit 56 is coupled to the conductor 43 via lead 57 so that pulse at time $t_k$ provided by the direct coupling to the cable conductor 43 "fires" the selector circuit 56 thereby to supply an output pulse at time $t_k$ to the timer circuit 53.

In order to obtain a time interval commencing from the first pulse 32a developed at time $t_1$ in response to acoustic energy intercepting receiver No. 1, the switch M has a No. 1 position to couple the output of the keyer circuit 18 to the input 55a of first selector circuit 55 while disconnecting the first coincidence circuit 49, so that the keyer pulse 21a readies the selector circuit 55 while the pulse 32a at time $t_1$ "fires" the selector circuit.

In the following table, examples of the relationship between the empirical example above and the previously discussed pulses 32a–32d at times $t_1$–$t_4$ are as follows:

TABLE IV

| Time Interval Desired | Pulse Supplies to 1st Selector Circuit at times— | | Pulse Supplied to 2nd Selector Circuit at times— | |
|---|---|---|---|---|
| | $t_j$–1 | $t_j$ | $t_k$–1 | $t_k$ |
| $\Delta t_1$ | $t_0$ | $t_1$ | $t_1$ | $t_2$ |
| $\Delta t_1 + \Delta t_2$ | $t_0$ | $t_1$ | $t_2$ | $t_3$ |
| $\Delta t_1 + \Delta t_2 + \Delta t_3$ | $t_0$ | $t_1$ | $t_3$ | $t_4$ |
| $\Delta t_2$ | $t_1$ | $t_2$ | $t_2$ | $t_3$ |
| $\Delta t_2 + \Delta t_3$ | $t_1$ | $t_2$ | $t_3$ | $t_4$ |
| $\Delta t_3$ | $t_2$ | $t_3$ | $t_3$ | $t_4$ |

The relationship of the various switch conditions to obtain the time intervals is provided in the following table.

TABLE V

| $\Delta t$ desired | Close Contacts 47 | Switch M Position |
|---|---|---|
| (1) $\Delta t_1$ | D, d; F, f | #1 |
| (2) $\Delta t_1 + \Delta t_2$ | E, e | #1 |
| (3) $\Delta t_1 + \Delta t_2 + \Delta t_3$ | E, e; F, f | #1 |
| (4) $\Delta t_2$ | A, a; C, c; E, e | #2 |
| (5) $\Delta t_2 + \Delta t_3$ | A, a; C, c; E, e; F, f | #2 |
| (6) $\Delta t_3$ | B, b; E, e; F, f | #2 |

Considering practical examples of the above-stated relationship, for example, the selector circuits 55, 56 may be arranged to produce a positive output pulse signal where the leading edge of the pulse signal is developed in response to a ready pulse while the trailing edge is developed in response to a "fire" pulse, the timer circuit 53 being triggered "on" and "off" in response to the trailing edge of the output pulse signal from the selector circuits.

If it is desired to measure at time interval $\Delta t$ from time $t_1$, then switch M is placed in a #1 position, and as shown in FIG. 4e, the output $Y_1$ of pulse selector circuit 55 readies at time $t_0$ in response to the keyer pulse 21a while the pulse 32a at time $t_1$ "fires" the selector circuit 55, so that its output triggers the timer circuit 53 at the time $t_1$. To obtain $\Delta t_1$, contacts 47D, 47d and 47F, 47f are closed so that at time $t_1$, coincidence outputs $X_2$, $Z_2$, being negative, "ready" the pulse selector 56 as shown by the output $Y_2$ in FIG. 4h, while the pulse 32b at time $t_2$ "fires" the pulse selector 56 which terminates the output of timer circuit 53 so that the time interval of the output of timer circuit 53 is equal to $\Delta t_1$.

To obtain a summation of $\Delta t_1$ and $\Delta t_2$, switch M remains in the #1 position to trigger the timer circuit 53 at time $t_1$ as above described while only switch contacts 47E, 47e are closed so that at time $t_2$, output $Z_1$ is negative and the output $Y_2$ of pulse selector circuit 56 is "ready" at time $t_2$ (FIG. 4i), the pulse 32c at time $t_3$ "firing" the selector circuit thereby terminating the output of timer circuit 53 which extended over at time duration from time $t_1$ to time $t_3$.

To obtain a summation of $\Delta t_1$, $\Delta t_2$ and $\Delta t_3$, switch M remains in the #1 position to trigger the timer circuit 53 at the time $t_1$, as above described while switch contacts 47E, 47e and 47F, 47f are closed so that at time $t_3$, outputs $X_2$ and $Z_1$ are negative so that pulse selector 56 is ready at time $t_3$ (FIG. 4j), the pulse 32d at time $t_4$ firing the selector circuit thereby terminating the output of timer circuit 53 which extended over a time duration from time $t_1$ to time $t_4$.

To obtain the time interval $\Delta t_2$, switch M is placed in the #2 position, while switch contacts 47A, 47a; 47C, 47c and 47E, 47e are closed. Thus, at time $t_1$, the outputs $X_2$ and $Z_2$ being negative "ready" pulse selector 55 (FIG. 4) and at time $t_2$, pulse 32b "fires" the selector circuit 55 triggering the timer circuit 53. The output $Z_1$ being negative at time $t_2$ "readies" the pulse selector 56 (FIG. 4i) and at time $t_3$, pulse 32c "fires" the selector circuit terminating the pulse output of timer circuit 53 which extended over the time duration between time $t_2$ and $t_3$.

To obtain the summation of time intervals $\Delta t_2$ and $\Delta t_3$, switch M remains in the #2 position, while switch contacts 47A, 47a; 47C, 47c; 47E, 47e; 47F, 47f are closed. Thus, at times $t_1$ and $t_2$, pulse selector 55 is "ready" and "fired" as above-described, while at time $t_3$ (FIG. 4j) the pulse selector 56 is made "ready" by negative coincidence outputs $X_2$ and $Z_1$. At time $t_4$, pulse 32d "fires" selector circuit 56 terminating the output of timer circuit 53 which extended over the time duration between times $t_2$ and $t_4$.

The pulse output of timer circuit 53 is supplied to an integrating circuit 59 and a velocity circuit 60 which are coupled to galvanometers in the recorder 17 to provide indications of velocity and total travel time. Exemplary forms of both the integrating and velocity circuits are more fully explained in my copending application Serial No. 841,401 filed September 21, 1959 and thus need not be further described herein as their description is not necessary for an understanding of the present invention. It will also be apparent that by providing a second panel circuit like that just described with respect to FIG. 2, two independent indications may be obtained, for example, indications of acoustic velocity over spans of, say, one foot and three feet.

Figure 5:
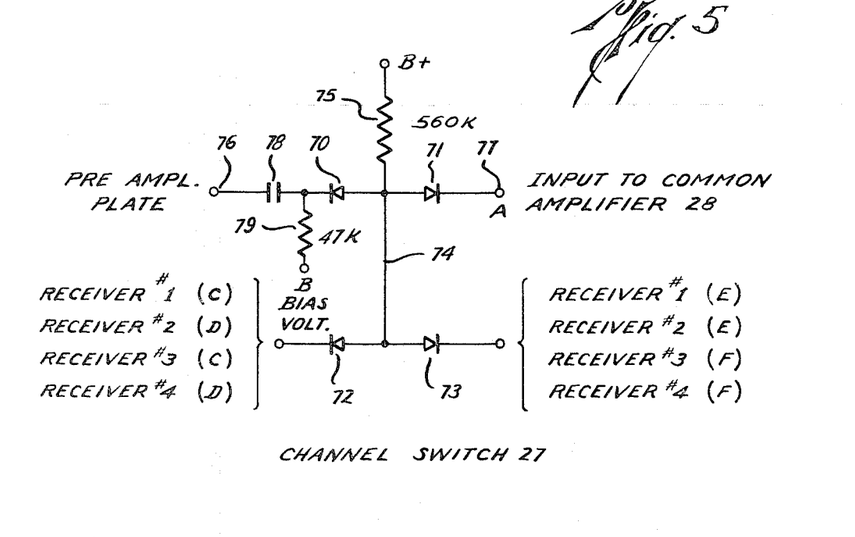
FIG. 5-7 are schematic illustrations of portions of the electronic equipment illustrated in FIG. 1.
Figure 6:
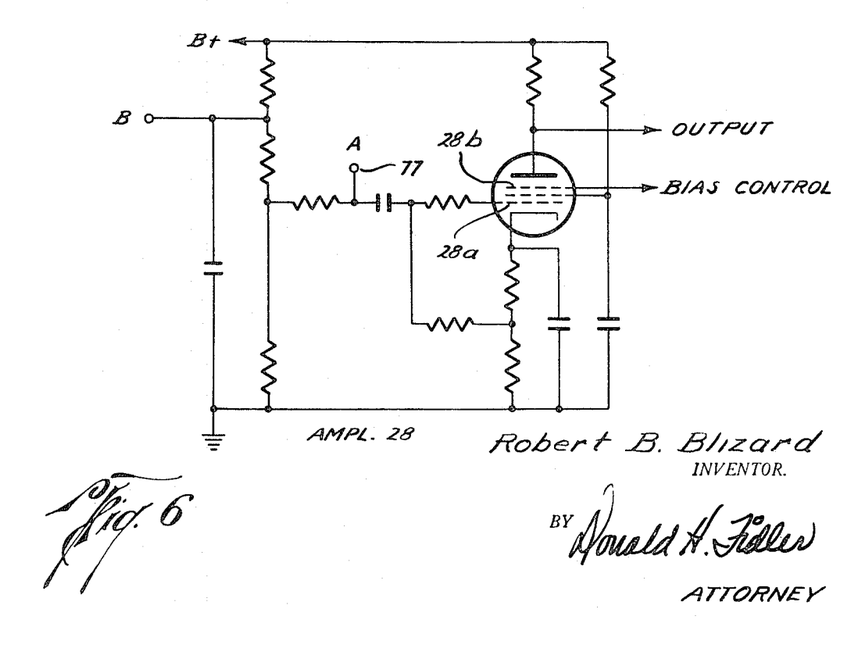

Referring now to FIGS. 5-8, additional details of the circuitry in the borehole exploring instrument will now be further explained. In FIG. 5, only one of the channel switches is illustrated since each switch is similar and an explanation of one switch will suffice for the others. Channel switch 27 may comprise, for example, four diodes 70, 71, 72 and 73 coupled together and poled to conduct current away from a common junction indicated by the numeral 74. Current is supplied to the common junction 74 via a resistance 75 coupled to a source of potential B+. Diodes 70, 71 are arranged to pass a voltage signal between an input terminal 76 and an output terminal 77 whenever the diodes 72, 73 are in a nonconducting state. Diode 70 is thus coupled via a capacitor 78 to the output of the preamplifier (e.g., plate of an amplifier tube) while the diode 71 is coupled to the variable gain amplifier 28 via terminal 77 (FIG. 6). A bias voltage is provided across the diode 70 through a resistance 79. Assuming diodes 72, 73 to be nonconducting, it will be appreciated that a voltage signal from the preamplifier will be passed to the variable gain amplier 28.

Figure 7:
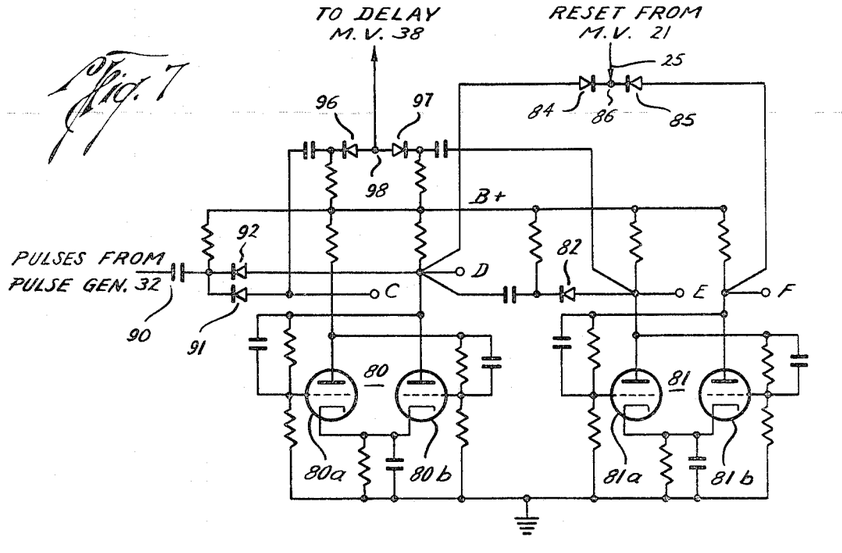

In each of the channel switches, the diodes 72, 73 for each switch are coupled to various different connections C, D, E and F of the channel driving circuit 26 (FIG. 7). As shown in FIG. 5, in the channel #1 switch, diodes 72, 73 are coupled to connections C and E, respectively, of the channel driving switch 26 (FIG. 7); the corresponding diodes in #2 channel switch are, respectively, coupled to connections D and E of the channel driving switch 26; the corresponding diodes in #3 channel switch are, respectively, coupled to connections C and F of the channel driving switch 26; and the corresponding diodes in #4 channel switch are, respectively, coupled to connections D and F of the channel driving switch 26. It will be appreciated that, if the signals to the diodes 72, 73 are positive, the diodes will not conduct and a voltage signal to the input diode 70 will be passed by the output diode 71; however, should one of the diodes 72, 73 conduct, a signal to the input diode 70 will not pass to the output diode 71.

The amplifier 28 as shown in FIG. 6 may be comprised of a high gain dual control pentode such as a CK5784 wherein one of the control grids 28a receives the input signal from a channel switch via connection terminal 77 while the remaining grid 28b is suitably connected via cable conductor 28c to a conventional bias voltage circuit 28d whereby the amplification of the signal can be controlled from the surface.

Figure 8:
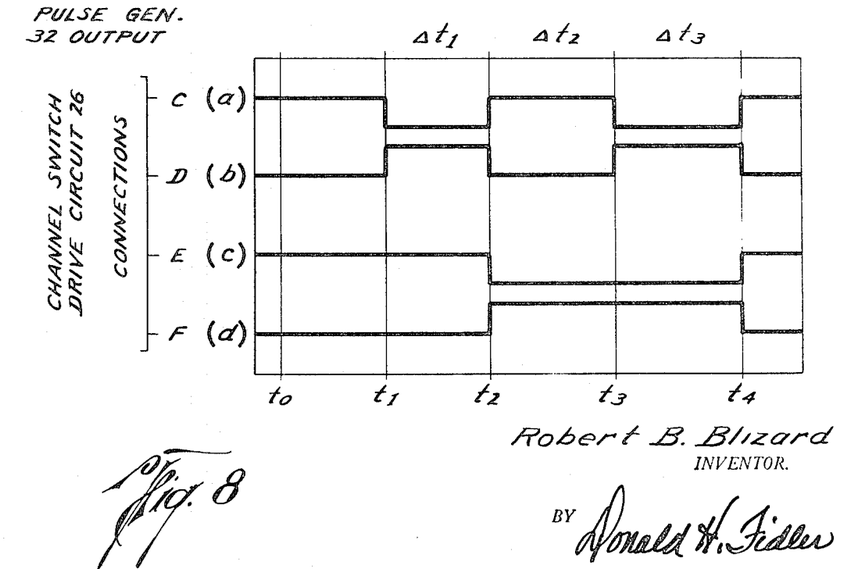
FIG. 8 is a graph illustrating the sequence of events in the operation of the equipment in FIG. 7.

Turning now to FIG. 7, the channel switch driving circuit 26 may include bistable multivibrators 80 and 81 having vacuum tubes 80a, 80b and 81a, 81b, respectively, the pairs of tubes being connected up in the customary manner so that one tube of each multivibrator conducts while the other tube is nonconducting. Output connections C and D of multivibrator 80 may therefore have output signals as shown by the waveforms in FIGS. 8(a) and 8(b) while output connections E and F of multivibrator 81 may have output signals as shown by waveforms in FIGS. 8(c) and 8(d). Output connection D of tube 80 is coupled by a diode 82 to output connection E of tube 81a so that each time tube 80b is pulsed into conduction, tube 81a will also be pulsed into conduction. A pair of diodes 84, 85 are oppositely poled and connected at a common junction connection 86 are connected to output connections D and F, respectively, so that a pulse signal from the master keyer 21 causes the tubes 80b, 81b in the multivibrators 80, 81, respectively, to conduct with a result that the output voltage at connections D and F is relatively negative from the time $t_0$ while the output voltage at connections C and E is relatively positive. Thus, from time $t_0$ to time $t_1$, the diodes 72, 73 in #1 channel switch 27, being non-conducting, permit the receiver signal $R_{1a}$ to pass to the amplifier 28 so that, ultimately, the pulse 32a at time $t_1$ is developed. The pulse 32a is supplied via the input 90 of the channel switch driving circuit 26 to diodes 91, 92 which are poled so that the pulse is applied simultaneously to the output connections C and D with the result that tube 80b is rendered nonconductive while tube 80a is rendered conductive and the output voltages reverse so that at connection D the output is positive.

The relationship of the voltage signals at output connections C, D, E, and F at the various time $t_0$–$t_4$ can be easily seen from the waveforms in FIG. 8. From the waveforms and foregoing discussion, it will be appreciated that #1 channel switch 27 is open only from time $t_0$ to time $t_1$; #2 channel switch 37 is open only from time $t_1$ to time $t_2$; #3 channel switch 40 is open only from time $t_2$ to time $t_3$; and #4 channel switch is open only from time $t_3$ to time $t_4$.

While the foregoing discussion has, for purposes of explanation, discussed the reset of channel switch drive circuit 26 by the multivibrator 21 (FIG. 1) it will be apparent that the reset is not necessary since the #4 channel switch, after passing pulse 32d at time $t_4$, is closed and the #1 channel switch will be opened. Thus, with the operation in the well bore, the first acoustic pulse will condition the #1 channel switch to set up the switching sequence.

To provide the time delay of 30 milliseconds to the gate 31 from delay multivibrator 38 and switch multivibrator 30, a pair of diodes 96, 97 are reversely connected between a junction 98 and output connections C and D, the junction 98 being coupled to the delay multivibrator 38. Thus, each time the tubes reverse their conducting conditions, the delay multivibrator 38 is triggered.

It will be appreciated that the foregoing systems described may be enlarged or contracted without detracting from the disclosed system. For example, 3 or 5 or even more receivers may be used with additional channel switching circuits. In the case of more than four receivers, the drive circuit 26 would include additional multivibrators for switching between the channels.

Also, in the pulse selecting systems as disclosed in FIG. 2 additional counter, coincident and selector circuits may be added to accommodate additional travel time indications. Further, more than one system can be provided so that two or more logs representing two or more different $\Delta t$ indications may be simultaneously recorded. Hence, as shown in FIG. 2 conductor 43 may be coupled to a system 100 identical to the system described with respect to FIG. 2 and coupled to integrator circuit 59' and velocity circuit 60' to provide indications in the recorder.

Figure 9:
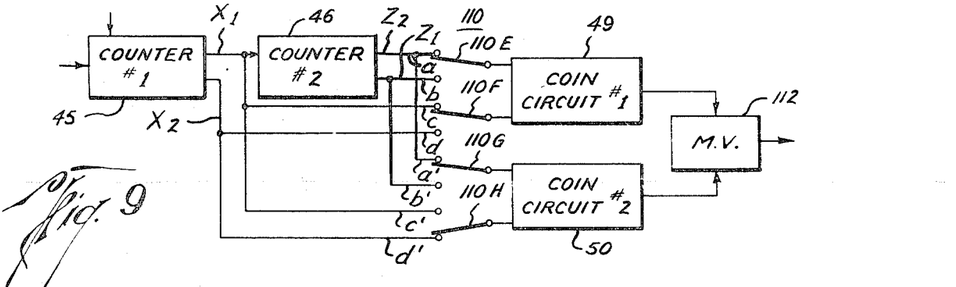
FIG. 9 is a schematic diagram showing another aspect of systems comprising the present invention.

The foregoing pulse selecting systems provide a capability for handling a large number of receivers. Referring now to FIG. 9, another arrangement of the systems illustrates how the time interval may be obtained directly without the need of selector circuits 55 and 56 by a different utilization of the outputs of the counter circuits 45 and 46 with a different switching system 110 selectively coupling circuits 45, 46 to coincidence circuits 49, 50. In the system of FIG. 9, switch 110 has stationary contacts 110 (a–d) and 110(a'–d') and movable arm contacts 110 (E–H). Movable contacts 110E and 110F are connected to the inputs of coincidence circuit 49 so that coincidence circuit 49 produces an output signal whenever the input signals are relatively negative. In a similar manner, movable contacts 110G and 110H are connected to the inputs of coincidence circuit 50 so that circuit 50 will produce an output signal whenever the input signals to the circuit 50 are relatively negative.

Coupled to the outputs of coincidence circuits 49, 50 is a bistable multivibrator 112 which is responsive to the outputs of the circuits 49, 50 to develop an output signal having a time duration which is related to the time interval between output signals of the circuits 49, 50. Multivibrator 112 may, for example, be turned "on" by the trailing edge of a signal pulse output of coincidence circuit 49 and turned "off" by the trailing edge of a signal pulse output of coincidence circuit 50. Hence, if contacts 110a, 110E and 110c, 110F are closed, the coincidence circuit 49 will produce an output signal during the time $t_0$–$t_1$ when the outputs $X_1$ and $Z_2$ are relatively negative (see FIGS. 4a and 4d) and at the time $t_1$ when coincidence of the signals ceases, the multivibrator 112 will be turned "on." If contacts 110a'–110G and 110d'–110H are closed, the concidence circuit 50 will produce an output signal during the time $t_1$–$t_2$ when outputs $X_2$ and $Z_2$ are relatively negative (FIGS. 4b, 4d) and at the time $t_2$ when the coincidence of the signals ceases, the multivibrator 112 will be turned "off." Thus, the multivibrator produces a $\Delta t$ indication between the times $t_1$ and $t_2$ which is supplied to the recording apparatus.

It will be appreciated that in the above-described system the time $t_0$ referred to is obtained by the reset pulse when the transmitter is triggered and times $t_1$ and $t_2$ correspond to the pulses 32a and 32b developed by the bore instrument in response to acoustic energy.

For a more complete understanding the following tables are presented illustrate overall system operation.

TABLE VI

| Contacts Closed | Coincidence Circuit 49 Output During— | | | |
|---|---|---|---|---|
| | $t_0$–$t_1$ | $t_1$–$t_2$ | $t_2$–$t_3$ | $t_3$–$t_4$ |
| 110a, 110E–110c, 110F | Yes | | | |
| 110a, 110E–110d, 110F | | Yes | | |
| 110b, 110E–110c, 110F | | | Yes | |
| 110b, 110E–110d, 110F | | | | Yes |

TABLE VII

| Contacts Closed | Coincidence Circuit 50 Output During— | | | |
|---|---|---|---|---|
| | $t_0$–$t_1$ | $t_1$–$t_2$ | $t_2$–$t_3$ | $t_3$–$t_4$ |
| 110a', 110G–110c', 110H | Yes | | | |
| 110a', 110G–110d', 110H | | Yes | | |
| 110b', 110G–110c', 110H | | | Yes | |
| 110b', 110G–110d', 110H | | | | Yes |

From the foregoing Tables VI and VII, it will be appreciated that a variety of combinations of $\Delta t$ measurements may easily be obtained by means of the disclosed invention.

Figure 10:
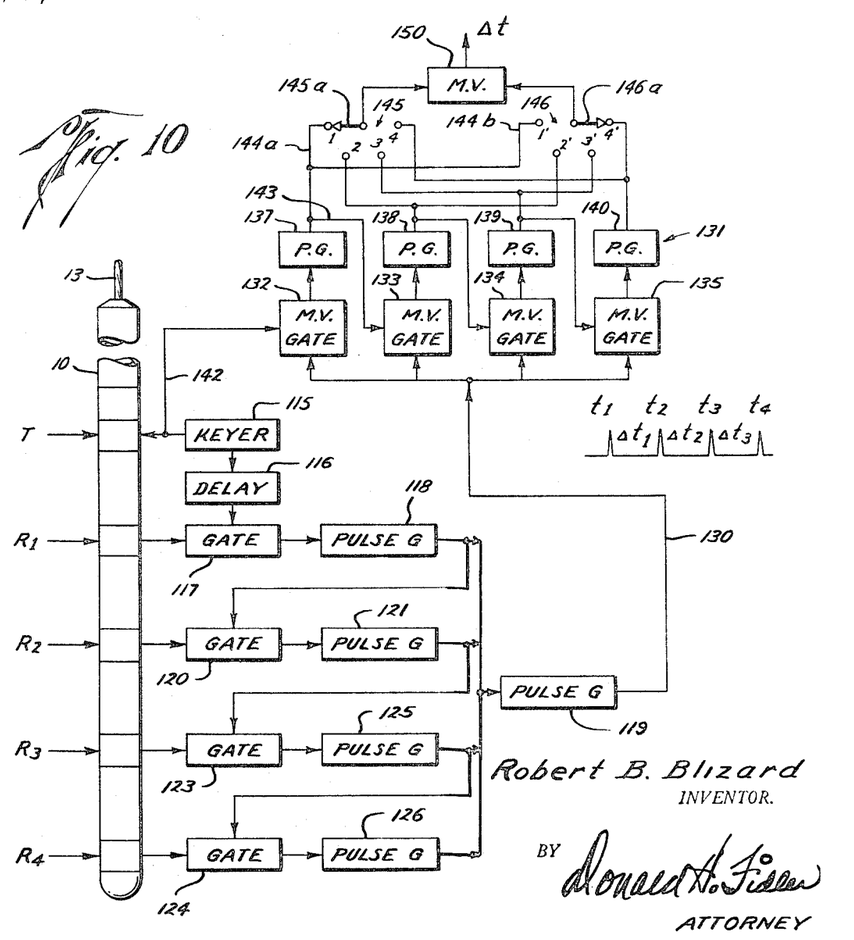
FIG. 10 is a schematic diagram showing still another aspect of systems comprising the present invention.

Still another aspect of the present invention is illustrated in FIG. 10 wherein a logging apparatus 10 similar to that shown and described with respect to FIG. 1 is adapted for transportation through a borehole. A keyer circuit 115 is adapted to repetitively actuate the transmitter T which therefore emits periodic pulses of acoustic energy. Receiver $R_1$ is coupled via a normally closed gate circuit 117 to a pulse generator 118. A time delay circuit 116 is coupled between the keyer circuit 115 and gate circuit 117 and is timed to open the gate circuit 117 just prior to the earliest possible arrival of acoustic energy at receiver $R_1$. Thus, when the acoustic energy arrives at the receiver $R_1$, a signal is developed which is passed to the pulse generator 118. The pulse generator may be provided with an adjustable bias level which, for example, may be suitably controlled by a surface control (not shown) so that with a proper bias setting, the time of arrival may be indicated by the developed signal exceeding the bias level and thereby triggering the pulse generator 118 to produce a single output pulse or time marker. The output pulse of pulse generator 118 is fed to a master pulse generator 119 to develop a master output pulse or time marker. The output pulse of pulse generator 118 is also supplied to a normally closed gate circuit 120 to open the same. Gate circuit 120 is coupled between receiver $R_2$ and a pulse generator 121. Hence, when the acoustic energy arrives at receiver $R_2$, the pulse generator 121 develops an output pulse which is supplied to the master pulse generator 119. Receivers $R_3$ and $R_4$ are similarly provided with gates 123, 124 and pulse generators 125, 126 which function in a manner similar to the above-described operation.

Pulse generator 119 therefore develops a series of pulses at times $t_1$–$t_4$ corresponding to the time of arrival of acoustic energy at receivers $R_1$–$R_4$ which are coupled via a lead 130 to a system 131 which derives a signal output representative of a time interval or $\Delta t$ measurement. The time interval may be selected from any of the pulses in the train of pulses from pulse generator 119 in a manner which will hereinafter be described.

The system 131 includes a plurality of bistable multivibrator gate circuits 132–135, the number of gate circuits corresponding to the number of receivers in the apparatus 10. Each of the gate circuits has an input coupled to the lead 130 so that each pulse of the train of pulses places the gate multivibrators in a first operative condition. Each of the gate multivibrators 132–135 is respectively coupled to pulse generator circuits 137–140, the pulse generator circuits being responsive to the switching of the gate multivibrators from a second operative condition to its first operative condition to develop an output signal.

A sequence of operation of the circuits to provide the $\Delta t$ indications is obtained by interconnection of the pulse generators 137–140 to gates 132–135. The first gate multivibrator 132 is coupled via a lead 142 to the keyer circuit 115 so that when the transmitter T is triggered, gate multivibrator 132 is placed in its second operative condition.

To facilitate an understanding of the operation assume that an initial acoustic pulse of the transmitter T has been emitted, and pulse generator 119 develops pulse outputs at times $t_1$–$t_4$ so that prior to the second acoustic pulse all of multivibrator gates 132–135 are in their first operative condition. The keyer circuit 115 then generates the second acoustic pulse and gate multivibrator 132 is placed in its second operative condition. At the time $t_1$, a pulse output from pulse generator 119 is simultaneously applied to the gate multivibrators 132–135. Gate multivibrator 132 only responds to the pulse output to change from its second operative condition to its first operative condition which actuates the pulse generator 137. The output of pulse generator 137 is supplied via a lead 143 to gate multivibrator 133 placing the gate multivibrator 133 in its second operative condition. The pulse output of pulse generator 137 is also supplied via leads 144a, 144b to contacts 1 and 1' of switches 145, 146 respectively.

The pulse output of pulse generator 119 at time $t_2$ actuates multivibrator gate 133 and thus pulse generator 138 to develop a pulse output at the time $t_2$, the pulse output operatively conditioning the multivibrator gate 134 in a manner as described above. This sequence of operation continues so that pulse generators 137–140 respectively develop pulse outputs or time markers at the times $t_1$–$t_4$ corresponding to the time of arrival of acoustic energy at the respective receivers $R_1$–$R_4$. Pulse generator 138 is coupled to contacts 2 and 2' of switches 145, 146 respectively; pulse generator 139 is coupled to contacts 3 and 3' of switches 145, 146 respectively; and pulse generator 140 is coupled to contacts 4 and 4' of switches 145, 146 respectively. Switches 145, 146 have movable arm contacts 145a, 146a respectively which are arranged to connect with any of the contacts 1–4 and 1'–4' of the respective switches. The movable arm contacts 145a and 146a are coupled to the input of a bistable multivibrator 150 so that a pulse input from switch 145 will turn the multivibrator 150 "on" while a pulse from switch 146 will turn the multivibrator "off," the time duration that the multivibrator is "on" being a measurement of $\Delta t$ between the selected pulses from the respective switches. It will therefore be appreciated without further discussion that any desired $\Delta t$ measurement may be obtained by selected connections of the switches 145, 146. The conversion of the $\Delta t$ time duration pulse to an indication in the recorder may be accomplished in any one of the well-known procedures presently employed in acoustic logging. Likewise a total travel time integration may similarly be accomplished.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

What is claimed is:

1. Acoustic well logging apparatus comprising: a support for lowering in a well bore, more than two acoustic receivers spaced along said support, means coupled to said receivers for producing electrical pulse signals at times corresponding to the successive incidence of a pulse of acoustic energy with said receivers, means responsive to each of said pulse signals for developing coded signals uniquely identifying said respective pulse signals with the corresponding receivers, and means responsive to a selected pair of coded signals for developing a signal representative of the time interval between the occurrence of said pulse signals which correspond to said selected pair of coded signals.

2. Apparatus for use in a well bore which contains a fluid comprising: a support adapted for passage through a well bore; transmitter means on said support adapted to be periodically energized to develop pulses of acoustic energy; first, second and third receiver means on said support spaced from one another and from said transmitter means and adapted to develop electrical signals in response to each pulse of acoustic energy; first, second and third channel switch means selectively operable for passing developed electrical signals, said channel switch means having inputs respectively coupled to said first, second and third receiver means; means coupled to the outputs of said channel switch means and responsive to said electrical signals developed in response to each pulse of acoustic energy for developing time marker outputs; channel switch driving means having its output coupled to said first, second and third channel switches and an input coupled to said time marker means and responsive to the respective time marker outputs for respectively operating said channel switch means in sequence; and means coupled to said time marker means for developing indications of the time interval between selected ones of said time markers.

3. Apparatus for use in a well bore which contains a fluid comprising: a support adapted for passage through a well bore; transmitter means on said support adapted to be periodically energized to develop pulses of acoustic energy; first, second and third receiver means on said support spaced from one another and from said transmitter means and adapted to develop electrical signals in response to each pulse of acoustic energy; first, second and third channel switch means selectively operable for passing developed electrical signals for each pulse of acoustic energy, said channel switch means having inputs respectively coupled to said first, second and third receiver means; means coupled to the outputs of said channel switch means and responsive to said electrical signals for developing time marker outputs; channel switch driving means having its output coupled to said first, second and third channel switches and an input coupled to said time marker means and responsive to the respective time marker outputs for respectively operating said channel switch means in sequence.

4. Apparatus for use in a well bore which contains a fluid comprising: a support adapted for passage through a well bore, transmitter means on said support adapted to be periodically energized to develop pulses of acoustic energy; first, second and third receiver means on said support spaced from one another and from said transmitter means and adapted to develop electrical signals in response to each pulse of acoustic energy; first, second and third channel switch means selectively operable for passing developed electrical signals for each pulse of acoustic energy, said channel switch means having inputs respectively coupled to said first, second and third receiver means and outputs coupled to one another to provide a single output channel; channel switch driving means having outputs coupled to said first, second and third channel switches and an input coupled to said single output channel and responsive to the respective signals in the output channel translated by one of said channel switches to operate another channel switch means.

5. Apparatus for use in a well bore which contains a fluid comprising: a support adapted for passage through a well bore; transmitter means on said support adapted to be periodically energized to develop pulses of acoustic energy; first, second and third receiver means on said support spaced from one another and from said transmitter means and adapted to develop electrical signals in response to each pulse of acoustic energy; first, second and third channel switch means selectively operable for passing developed electrical signals fo reach pulse of acoustic energy, each of said switch means having inputs respectively coupled to said first, second and third receiver means and outputs coupled to one another to provide a single output channel; means coupled to said single output channel responsive to said electrical signals for developing time marker outputs; channel switch driving means having outputs coupled to said first, second and third channel switches and an input coupled to said time marker means and responsive to the respective signals in the output channel translated by one of said channel switches to operate another channel switch means.

6. Apparatus for use in a well bore which contains a fluid comprising: a support adapted for passage through a well bore; transmitter means on said support adapted to be periodically energized to develop pulses of acoustic energy; first, second and third receiver means on said support spaced from one another and from said transmitter means and adapted to develop electrical signals in response to each pulse of acoustic energy; first, second and third channel switch means selectively operable for passing developed electrical signals for each pulse of acoustic energy, said switch means having inputs respectively coupled to said first, second and third receiver means and outputs coupled to one another to provide a single output channel; means coupled to said single output channel responsive to said electrical signals for developing time marker outputs; channel switch driving means having outputs coupled to said first, second and third channel switches and an input coupled to said time marker means and responsive to the respective signals in the output channel translated by one of said channel switches to operate another channel switch means; means coupled to said time marker means and responsive to a selected pair of said time markers for developing indications of the time interval therebetween.

7. Apparatus for use in a well bore which contains a fluid comprising: a support adapted for passage through a well bore; transmitter means on said support adapted to be periodically energized to develop pulses of acoustic energy; first, second and third receiver means on said support spaced from one another and from said transmitter means and adapted to develop electrical signals in response to each pulse of acoustic energy; first, second and third channel switch means selectively operable for passing developed electrical signals for each pulse of acoustic energy, each of said switch means having inputs respectively coupled to said first, second and third receiver means and outputs coupled to one another to provide a single output channel; means coupled to said single output channel responsive to said electrical signals for developing time marker outputs; channel switch driving means having outputs coupled to said first, second and third channel switches and an input coupled to said time marker means and responsive to the respective signals in the output channel translated by one of said channel switches to operate another channel switch means; first means at the earth's surface coupled to said time marker means and responsive to a pair of said time markers for developing indications of the time interval therebetween; and second means at the earth's surface coupled to said time marker means and responsive to another selected pair of said time markers for developing indications of the time interval therebetween.

8. Acoustic well logging apparatus comprising: a support for lowering in a well bore, a plurality of acoustic receivers spaced along said support, means coupled to said receivers for developing electrical pulse signals at times corresponding to the successive incidence of a pulse of acoustic energy relative to said receivers, means responsive to the respective pulse signals for developing respectively coded signals uniquely characteristic of the receivers from which they are derived, means responsive to said coded signals for developing a signal representative of the time interval between a selected pair of said coded signals, and means coupled between said coded signal means and said last-mentioned signal developing means for selecting any pair of coded signals to be supplied to said signal developing means.

9. Apparatus for use in a well bore comprising: acoustic exploring means adapted for passage through the bore and including at least three spaced acoustic transducer means for developing respective successive electrical signals corresponding to the incidence of an acoustic energy impulse thereat, means coupled to said transducer means for developing time sequenced signals in response to electrical signals of the respective transducer means; counter circuit means coupled to said time sequenced signals means and responsive to said time sequenced signals for developing uniquely characteristic output signals for each of said time sequenced signals; means coupled to said counter circuit means for selecting certain ones of said characteristic output signals, and circuit means coupled to said selecting means for developing a signal which is representative of the time interval between said selected characteristic output signals.

10. A method of exploring a well bore comprising the steps of: passing an acoustic well logging tool through a well bore, said tool having at least one transmitter and at least three receivers at spaced distances from one another, periodically actuating said transmitter while said tool is passed through the well bore, thereby periodically producing acoustic impulses, detecting the arrival of each acoustic impulse at each receiver, deriving for each acoustic impulse arrival, a signal representative of the time of arrival for such acoustic impulse at each receiver, encoding each of said signal to be uniquely characteristic of the receiver from which it is derived, thereby forming a sequence of time spaced encoded signals for each acoustic impulse, selecting a pair of signals from said sequence of time spaced signals and deriving an indication of the time interval between said pair of signals, and recording said indications as a function of depth of the tool in the well bore.

11. A method of exploring a well bore comprising the steps of: passing an acoustic well logging tool through a well bore, said tool having at least one transmitter and at least three receivers at spaced distances from one another, periodically actuating said transmitter while said tool is passed through the well bore, thereby periodically producing acoustic impulses, detecting the arrival of each acoustic impulse at each receiver, deriving for each acoustic impulse arrival, a signal representative of the time of arrival for such acoustic impulse at each receiver, encoding each said signal to be uniquely characteristic of the receiver from which it is derived, thereby forming a sequence of time spaced encoded signals for each acoustic impulse, selecting a first pair of signals from said sequence of time spaced signals and deriving a first indication of the time interval between said first pair of signals, selecting a second pair of signals from said sequence of time spaced signals and deriving a second indication of the time interval between said second pair of signals, said first and second pairs of signals being selected to represent different time intervals, and recording said first and second indications as a function of depth of the tool in the well bore.

12. Apparatus for use in a well bore comprising: a support adapted for passage through a well bore, transmitter means on said support adapted to be energized periodically to develop spaced pulses of acoustic energy; first, second and third receiver means on said support spaced from one another and from said transmitter means and adapted to develop electrical signals in response to a pulse of acoustic energy; first, second and third channel switch means normally blocking passage of a signal therethrough but which are selectively operable for passing said electrical signals developed in response to said pulse of acoustic energy, each of said switch means having an input and an output, said inputs being coupled respectively to said first, second and third receiver means and channel switch driving means having an input coupled to the outputs of said channel switch means and outputs coupled to said first, second and third channel switch means for rendering said channel switch means operable to pass electrical signals from their respective receivers, said channel switch driving means being initially operable to render said first channel switch means operable and responsive to an output from said first channel switch means to render operable said second channel switch means, and to an output from said second channel switch means to render operable said third channel switch means.

13. Apparatus for use in a well bore comprising: acoustic exploring means adapted for passage through the well bore and including at least three spaced acoustic transducer means for developing electrical signals corresponding to the incidence of acoustic energy thereat, means coupled to said transducer means for deriving time sequenced signals in response to the electrical signals developed by the respective transducer means; and time measuring means coupled to said signal deriving means for selectively measuring the time interval between any two of said time sequenced signals, said measuring means including selection means coupled to said signal deriving means for individually selecting from said time sequenced signals the two of said signals defining the time interval desired to be measured and providing outputs representative of said two signals, and means coupled to said selection means and responsive the the outputs thereof to provide an indication of the time interval between the times of occurrence of said two signals selected from said time sequenced signals.

References Cited by the Examiner
UNITED STATES PATENTS

| | | | |
|---|---|---|---|
| Re. 24,446 | 3/1958 | Summers | 181—0.5 |
| 2,190,686 | 2/1940 | Slichter | 181—0.5 |
| 2,708,485 | 5/1955 | Vogel | 181—0.5 |
| 2,865,463 | 12/1958 | Itria | 181—0.5 |
| 2,931,455 | 4/1960 | Loofbourrow | 340—18 X |
| 2,934,741 | 4/1960 | Gray et al. | 181—0.5 |
| 2,949,973 | 8/1960 | Broding et al. | 181—0.5 |
| 3,018,839 | 1/1962 | Isaacson | 181—0.5 |
| 3,022,488 | 2/1962 | Stripling | 181—0.5 |
| 3,102,992 | 9/1963 | Savage et al. | 340—18 |
| 3,148,352 | 9/1964 | Summers | 181—0.5 X |
| 3,149,304 | 9/1964 | Summers | 181—0.5 X |

SAMUEL FEINBERG, *Primary Examiner.*

CHARLES W. ROBINSON, *Examiner.*

BENJAMIN A. BORCHELT, S. J. TOMSKY, J. W. MILLS, M. F. HUBLER, *Assistant Examiners.*